May 16, 1950     N. L. OATES     2,507,808
POSITIVE FISH-POSITIONING MEANS FOR FEEDER TABLES
Filed Feb. 11, 1942     2 Sheets-Sheet 1
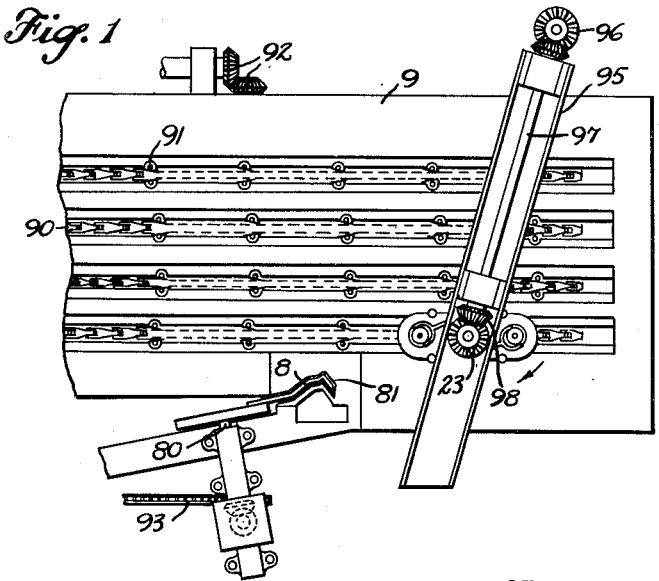
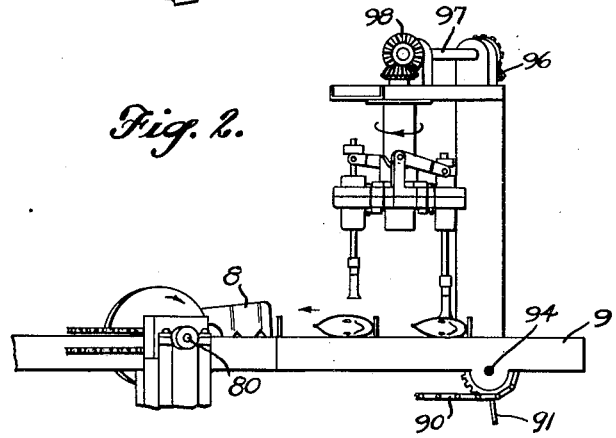
INVENTOR.
NORFORD L. OATES
BY
ATTORNEYS May 16, 1950   N. L. OATES   2,507,808
POSITIVE FISH-POSITIONING MEANS FOR FEEDER TABLES
Filed Feb. 11, 1942   2 Sheets-Sheet 2
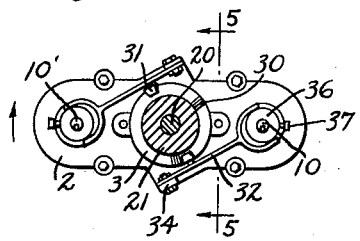
Fig. 4
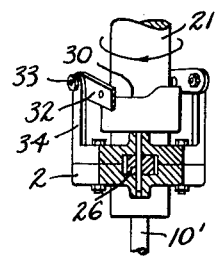
Fig. 5
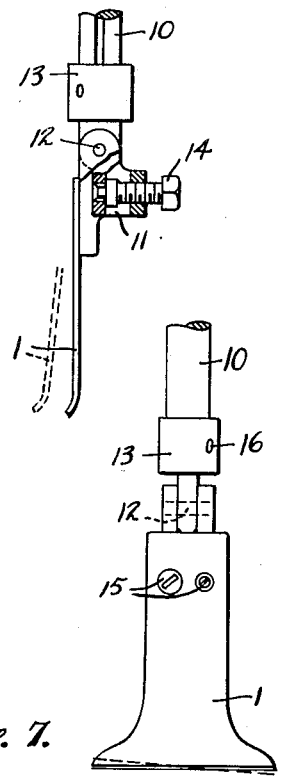
Fig. 6
Fig. 7
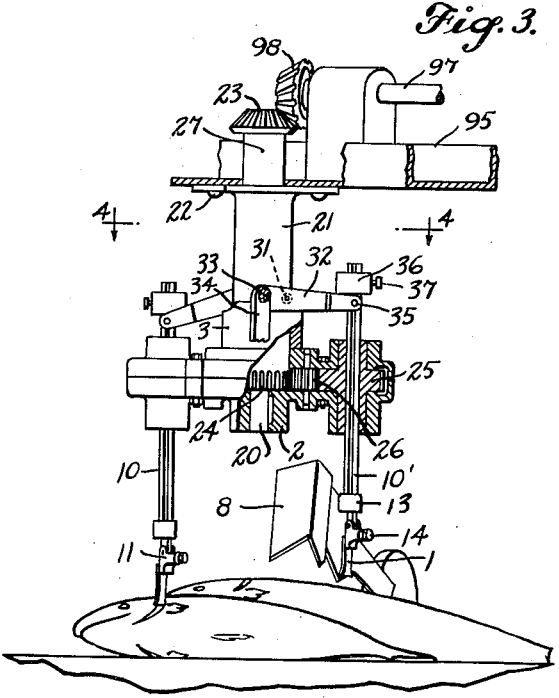
Fig. 3
INVENTOR.
NORFORD L OATES
BY
Reynolds + Beach
ATTORNEYS Patented May 16, 1950

2,507,808

UNITED STATES PATENT OFFICE 2,507,808

POSITIVE FISH-POSITIONING MEANS FOR FEEDER TABLES

Norford L. Oates, Seattle, Wash., assignor to Smith Cannery Machines Company, Seattle, Wash., a corporation of Washington Application February 11, 1942, Serial No. 430,367

28 Claims. (Cl. 17—4)

In modern fish dressing machines, particularly for salmon, the fish are advanced, while laid flatwise upon and transversely of the feeder table, to a beheading point, where they encounter a beheading knife. Because the large part of the fish, bearing high quality flesh, is immediately to the rear of the gills and pectoral girdle, and to a certain extent lies between the gills and within that girdle, it is extremely desirable that a minimum of this flesh be wasted, and that the beheading be effected along a line which is in the immediate vicinity of the pectoral girdle, yet at the same time it is undesirable to include any appreciable portion of the gill case, or of the pectoral girdle.

It is not easy to make the beheading cut with precision at the proper point. Because the fish vary appreciably in size, from three or four pounds, perhaps, to twenty pounds or more, in the case of commercial salmon, and their heads have corresponding variations in size, particularly in length, the desired positioning of the fish cannot be achieved by crowding the snouts of the fish against a head board set for fish of average size as a gauge, for this will cut off too much of the desirable flesh from the small fish, and leave too much of the bone and bony structure in the large fish.

Various attempts have been made to provide visual indicators for positioning the fish, or to provide devices the position of which relative to some part of the fish is predetermined, to engage within the gill or behind the pectoral girdle as a gauge, as for instance in my copending application Serial No. 442,706, filed May 12, 1942, as a division of my application Serial No. 329,714, filed April 15, 1940, now Patent 2,346,935, dated April 18, 1944, but since the fish are handled largely by unskilled, inattentive, and careless labor, it is not possible to insure that the fish will be properly positioned by the aid of such devices.

In an attempt to effect positioning of the fish, notwithstanding careless initial positioning, and by a device which would accomplish some shifting of the fish in the direction of its own length, there has been provided an inclined gauge element, which would engage the fish, preferably behind the pectoral girdle, and by its inclination, coupled with the advance of the fish in the general direction of the length of the inclined gauge board, the fish would be shifted in the direction of its snout, to be left in proper registry with respect to the beheading point or other registry point. An arrangement to this end was suggested in the copending application of Alvin L. Erickson, Serial No. 362,080, filed October 21, 1940. Again, while such devices for the first time effected accurate gauging by reason of engagement of the pectoral girdle, they did not prove entirely satisfactory, because it was only possible thus passively to move the fish through a short distance, and it was found that the workmen in practice would not initially position the fish with sufficient accuracy that these passive devices, capable of effecting only limited movement, would produce the necessary shifting in the position of the fish.

Accordingly, the present invention aims to provide a device similar to the devices of the two copending applications referred to, in that it engages behind each fish's pectoral girdle, thereby to locate it accurately with relation to the beheading point, but differing from such prior passive devices in that the present device is capable of positively and actively shifting the fish in a direction towards its snout, that is, snoutward or headward, through an appreciable distance, sufficient to encompass even the most carelessly positioned fish, thereby to leave the fish accurately positioned with respect to the beheading point.

Bearing in mind the general object of this invention, as just outlined, it has for further objects the provision of such locating means which will be relatively simple and rugged; which can be accurately synchronized with the fish advancing means, and, if the knife is rotary, with the rotary knife also; which does not unduly obstruct the working space on the feeder table; and which is capable of such adjustments as may be found desirable, particularly such as will compensate for variations in the general size of the fish, and for changes of adjustment in other parts of the machine.

With these and other objects in mind, my invention comprises the novel feeder table, and the novel fish positioning means therefor, and the combination and arrangement of the parts of the same, all as shown in the accompanying drawings, described in this specification, and as will be more particularly defined by the claims at the end of this specification.

In the accompanying drawings I have shown my invention embodied in a form which is at present preferred by me, it being understood that various changes may be made in the form, character, and relative arrangement of the parts without departing from the essence of the invention as outlined in the claims.

Figure 1 is a plan view of a feeder table, incorporating the novel fish positioning means, and Figure 2 is a side elevation of the same.

Figure 3 is a view looking at the fish positioning means in a position rotated somewhat farther than the position of Figures 1 and 2, parts thereof being broken away, from an oblique viewpoint at the corner of the table's feed end remote from the knife's edge of the table, and looking toward the knife.

Figure 4 is a section in top plan, substantially on the line 4—4 of Figure 3.

Figure 5 is a detail section substantially along the line 5—5 of Figure 4.

Figure 6 is an enlarged detail, with parts broken away, of the fish-engaging hoe, and Figure 7 is a similarly enlarged view of the same taken from a viewpoint 90° different from that of Figure 6.

The feed table itself need not appreciably depart from prior feed tables, and as shown is substantially identical with the feed table shown in the two prior copending applications, referred to above. It includes a surface 9, grooved to receive the endless chains 90, each carrying at intervals pins 91, arranged to cooperatively engage the rearmost side of a fish, and to advance it flatwise and disposed transversely, along the table 9. Such chains are driven in suitable fashion, the power connection being indicated fragmentarily at 92 and at 93. The chains run over sprocket wheels carried by shafts of which the shaft 94 is representative.

At a given point a beheading knife engages each fish as it advances along the table, and beheads it. So far as concerns the fish-positioning means of this invention, the beheading knife might be a fixed knife, and the fish might be advanced past this knife, as, for example, in the Waugh Patent No. 1,909,643, dated May 16, 1933, but in the present instance a rotary knife 8 is shown, carried upon a shaft 80. Rotation of the knife intersects the table at the beheading point 81, where the knife passes through a properly shaped plate in the surface of the table, and at the proper instant beheads a fish which has been advanced by the chains 90 and pins 91 to the beheading point. It is not necessary to illustrate the synchronizing mechanism between the chains and the knife, inasmuch as this is known in the art, and reference is made to the above mentioned Patent No. 2,346,935 for a fuller disclosure of the same.

The problem is to cause the fish always to occupy such position in the direction of its own length, that is, transversely of the table 9, by the time it arrives at the beheading point 81, that the knife 8 will sever the head in the immediate vicinity of the pectoral girdle, and not appreciably ahead of that line, nor appreciably behind it. If the fish is carelessly positioned this may require a shifting of as much as two or perhaps three inches, and usually it must be shifted in the direction of its snout, that is, headward. The fish is placed upon the table at the feeding point (at the right in Figure 1), and this positioning must either be quite accurate or the shifting must be accomplished as the fish travels from the feeding point to the point 81.

I provide for engagement behind the pectoral girdle of the fish, in the manner shown at the left in Figure 3, an implement which preferably is of the nature of a hoe, and which is shown at 1. This shifter 1 is suitably shaped and is disposed, during such time as it engages the fish, transversely of the latter, that is, generally in parallelism to the direction of the fish's advance. It is supported at the lower end of a vertical spindle 10. This spindle is mounted to revolve about the axis of a vertical shaft 20 whereon is mounted a rotatable head 2. In effect, as the head 2 rotates about the axis of 20 the spindle 10 revolves about the axis of 20, being disposed eccentrically of that axis. Preferably the head 2 supports two such spindles, which are identical, and the second of which, merely for purposes of identification, is termed the spindle 10'.

The entire assembly is supported over the table and over the head end of the fish, as the latter advance. The revolution of the spindle 10 around the axis of 20 will, through approximately 90°, give the spindle a component of movement which is in the direction of advance of the fish, and also a component in the direction of the fish's snout, that is, headward. If during this part of the rotary movement of the spindle and hoe they are moved downwardly into engagement with the fish, behind its pectoral girdle, as has just occurred in Figure 3 at the left, they will cause the fish, as it advances, to be positively dragged toward its snout, until the combination of components of movement just referred to no longer exists. Just before the component of spindle movement transversely of the feed table 9 reverses, that is, changes to one away from the knife's edge of the feed table, the spindle and its hoe 1 are caused to be lifted from engagement with the fish, and by this time the fish has been shifted towards its snout to such an extent, and to such a position, as to bring its pectoral girdle into exact registry with respect to the beheading point, if before it was not in accurate alignment therewith along the fish's path of advance by pins 91 of chains 90. Since no such shifting occurs until the hoe engages behind the pectoral girdle, it follows that an initially perfectly positioned fish is not shifted, and only such shifting occurs as is necessary to perfectly position each fish.

This action can occur in a variety of ways, and I have shown a convenient way of accomplishing that end in the mechanism which will now be described.

The dull, blade-like hoe 1 much be kept always parallel to its initial position, so that it extends transversely of the fish, and generally parallel to the direction of advance, at least so long as it is in contact with the fish. It would not do to permit this element to twist materially or to rotate about the spindle's axis, relative to the fish, while it is dragging the fish in the direction of its snout. It is therefore necessary to provide mechanism which, notwithstanding the revolution of the spindle around the axis of shaft 20, will maintain the hoe 1 always in parallelism to itself by effecting satellite or epicyclic rotation of such hoe as it rotates bodily about such shaft.

A further consideration is that the movement of the hoe must be synchronized with the advance of the fish, so that the component of movement of the hoe in the direction of the fish's advance does not produce any unduly faster movement of the hoe than the fish, nor any unduly slower movement, during most of the time the hoe is in engagement with the fish.

The driving mechanism for the fish-shifting means is designed to meet these two requirements. The spindle 20 is supported by a thrust bearing at 27 and is journaled within a sleeve 21; this sleeve is held against rotation by its securement at 22 to the overhead frame structure 95. The spindle 20 is rotated by a power take-off from the shaft 94, which extends vertically to the pair of bevel gears at 96, thence by way of the transverse shaft 97 to the bevel gear 98, meshing with the bevel gear 23 at the top of the shaft 20. By a proper relationship of the gears the revolution of the spindles 10 and 10' around the axis of shaft 20 can be approximately synchronized with the rate of advance of the fish as determined by the chains 90.

In the arrangement described it will be evident that the head 2, which is fast upon the vertical shaft 20, rotates with the latter, and is supported from the latter, and by the thrust bearing 27, and that the shaft 20 and head 2 rotate with respect to the fixed sleeve 21.

Formed upon the lower end of the shaft 20, within the revoluble head 2, is a fixed sun gear 24. Surrounding the spindle 10 is a planet gear 25, within which the spindle is keyed to slide axially and vertically, while the two must rotate together. The sun gear 24 and the planet gear 25 are identical in diameter, and in number of teeth, and intermediate them is an idler gear 26, supported from the head 2.

By following the action through a revolution of the head it will be seen that as the head 2 carrying the spindle 10 rotates, the spindle will revolve around the axis of 20, but will at the same time rotate on its own axis to the same angular extent, but in a reverse direction, with the net result that the hoe 1 remains always parallel to its initial position.

To effect the dropping of the hoe into engagement with the fish at the proper time, and its lifting out of engagement therewith, it is convenient to provide a fixed cam in the form of a collar 3 surrounding and fixed against rotation with respect to the sleeve 21. Through about 270° it is high, and through the remaining approximately 90° is low, as indicated at 30 (see Figures 4 and 5). Cooperating with this cam is a cam follower 31 carried upon a lifter arm 32. One end of the lifter arm is pivoted at 33 to a bracket 34 carried by and rotating with the head 2, and the other end of the lifter arm is forked, and pins 35, carried by this forked end, are disposed at opposite sides of the spindle 10 for engagement beneath a collar 36, which by the set screw 37 may be adjusted in position vertically along the upper end of the spindle 10. A corresponding arrangement controls movement of the spindle 10'.

As the head 2 rotates, carrying the spindles 10 and 10' around the axis of 20, at the proper time the cam follower 31 will ride down off the high part of the cam collar 3 onto the low portion 30, which will lower the hoe 1 into engagement with the fish beneath it. The collar 36 is so adjusted that the hoe 1 may drop to any proper low level, yet it may be raised without resistance other than the weight of the shaft and hoe to accommodate a fish of any thickness beneath it. As the head continues to rotate, the hoe 1 will slide along the fish toward its head, the weight of the fish being sufficient to prevent its movement by engagement of the hoe with its soft flesh. Nevertheless the weight of the hoe and shaft is great enough to press the hoe into the flesh of the fish sufficiently so that it will not ride over, but will engage behind the pectoral girdle of the fish, if it is improperly located, and, in the manner shown in Figure 3, will drag the fish toward its head end. After approximately 90° of rotation of the head with the hoe 1 in its lowermost position, the direction of movement of the hoe transversely of the table will reverse, or will so slow down relative to the speed of advance of the fish that longer contact of the hoe with the fish is inadvisable. At such time the hoe will be raised, the lifter arm 32 raising the collar 36 and spindle 10, and when this occurs the fish will have been so positioned with respect to the registry point, that is, the beheading point, that it is precisely and accurately located in alignment with the knife 8 for the proper beheading cut.

To permit minor adjustment of this location, and to compensate for adjustments in other parts of the machine or for differences in the condition of the fish, the hoe 1 may be slightly adjustable transversely of the axis of the spindle 10. For instance, as shown best in Figures 6 and 7, the hoe may be mounted upon a head 11 which is pivoted at 12 to a cap 13 upon the lower end of the spindle, and by adjustment of the screw 14, threaded in the head 11 and swiveled in an extension of the cap 13, the position of the hoe 1 about the axis of its immediate support at 12 can be adjusted. Likewise the tilt of its lower edge with respect to the horizontal can be adjusted by means of oversize holes in the spade receiving the screws 15, as may best be seen in Figure 7, where the head of one of the screws is omitted. The entire hoe assembly can be rotated around the axis of the spindle 10 by means of the adjustment permitted by the set screw 16. In such manner all necessary minor adjustments of the position of the hoe may be accomplished.

Since the spacing of the spindle's axis outward from the axis of 20 may, by the design of the machine, be anything desired, it is clear that such extent of movement of the fish as is necessary may be accomplished by this device. Two inches or so of movement transversely of the table is readily obtainable, and should be ample to move even a very carelessly placed fish to be brought into exact position at the beheading point.

The entire positioning device is overhead, and will not interfere appreciably with the feeding of the fish to the table at the feed point. Synchronization with the feeder means is simple, as the shifting means is positively driven from the feeder chain sprocket shaft 94. There is little that can get out of order, and the cam is a simple, fixed, contoured collar.

What I claim as my invention is:

1. A feeder table for fish-dressing machines comprising fish-advancing means operable to advance individual fish which are disposed transversely of the direction of advance, shifting means to engage each fish at the rear side of its pectoral girdle and to shift it positively snoutward by such engagement as it is advanced by said fish-advancing means to bring its pectoral girdle into precise registry with a selected registry point, said shifting means being guided for movement in a path from a location tailward of the pectoral girdle of each fish in the position it is normally placed upon the table, to a position such that the fish, regardless of the length of its head, is left with its pectoral girdle aligned with the registry point, and means to synchronize the movement of said shifting means with the movement of said fish-advancing means.

2. A feeder table for fish-dressing machines comprising, in combination with a beheading knife disposed to engage each fish as it passes a fixed beheading point, means to support and advance individual fish, which are disposed transversely of the direction of advance, to the beheading point, shifting means movable through a path which will bring such shifting means into engagement with each imperfectly positioned fish at the rear side of its uppermost pectoral girdle and which, by such engagement, will shift the fish, as it advances, towards its snout, and which shifting means will disengage from each such fish as soon as the pectoral girdle of the latter has been shifted into correct registry with the beheading point, regardless of the length of the fish's head, and means synchronized with the fish-advancing means thus to control movement of the shifting means, and thereby to position the pectoral girdle of each such fish perfectly with respect to the beheading point, before the fish reaches such beheading point, in its advance.

3. A feeder table for fish-dressing machines comprising, in combination with a beheading knife disposed to engage each fish as the latter passes a fixed beheading point, means to support and advance individual fish, which are disposed transversely of the direction of advance, to the beheading point, shifting means engageable with the rear side of the pectoral girdle of each imperfectly positioned fish, and movable in a path which has one component directed along the direction of advance and terminating short of the beheading point, and another component directed towards the snout of the fish, thus to shift an imperfectly positioned fish lengthwise, and terminating at a point which leaves the fish's pectoral girdle, regardless of the length of the fish's head, in such relation to the beheading point as will effect beheading along a selected line in the vicinity of the pectoral girdle, and means synchronized with the fish-advancing means to move said shifting means into position so as to engage each fish, as it advances, and to disengage said shifting means from the fish at the termination of such path.

4. A feeder table for fish-dressing machines comprising, in combination with a beheading knife disposed to engage each fish as it passes a fixed beheading point, means operable to advance individual fish flatwise and dispose transversely of the direction of advance, to the beheading point, shifting means disposed above the fish, as they advance, depending for engagement therewith, and movable with such a fish as it advances and also towards its snout end, means controlling movement of said shifting means to drop it from a level above the fish to a level to engage, at the rear side of its uppermost pectoral girdle, a fish imperfectly positioned for beheading, means to terminate the engagement of said shifting means with the fish's pectoral girdle as soon as such pectoral girdle reaches proper registry with the beheading point, regardless of the length of the fish's head, and means synchronized with the fish-advancing means thus to move the shifting means vertically and over the table.

5. The feeder table for a fish-dressing machine comprising fish-advancing means operable to positively advance each fish bodily transversely of its length, to a beheading point, and shifting means movable independently of said fish-advancing means, engageable with the pectoral girdle of each fish as the fish is advanced by said fish-advancing means, and operable during such advance and by such engagement to shift the fish positively and bodily lengthwise to leave the fish in position, prior to its reaching the beheading point and regardless of the length of its head, with its pectoral girdle in exact registration with the beheading point.

6. The feeder table defined in claim 5, and means to elevate the shifting means from engagement with the fish's pectoral girdle as soon as such girdle comes into registry with respect to the beheading point.

7. The feeder table defined in claim 5, wherein the shifting means includes a hoe extending generally parallel to the direction of the fish's advance.

8. The feeder table defined in claim 7, wherein the hoe remains engaged behind the pectoral girdle during the shifting of the fish, and means to elevate the hoe from such engagement as soon as such girdle comes into proper registry with respect to the beheading point.

9. The feeder table defined in claim 5, wherein the shifting means is formed as a hoe extending generally parallel to the direction of the fish's advance, and means operable to maintain the hoe always in such parallelism during shifting of the fish.

10. The feeder table defined in claim 5, wherein the shifting means further includes a vertical and vertically movable spindle shiftable over the table in a closed path, and a hoe carried upon the lower end of the spindle and disposed generally parallel to the direction of the fish's advance, and means interposed between the spindle and the hoe for adjusting the tilt of the hoe relative to the spindle.

11. The feeder table defined in claim 5, wherein the shifting means further includes a vertical and vertically movable spindle shiftable over the table in a closed path, and a hoe carried upon the lower end of the spindle and disposed generally parallel to the direction of the fish's advance, means to maintain the hoe always in such parallelism during shifting of the fish, and means interposed between the spindle and the hoe for limited adjustment of the hoe transversely with respect to the spindle's axis.

12. The feeder table defined in claim 5, wherein the shifting means comprises a head rotatable about a generally vertical axis, a vertical spindle eccentrically carried thereby, a fish-engaging member upon the lower end of said spindle, means driven from the fish-advancing means to rotate said head in synchronization with the fish-advancing means, a cam follower operatively connected to raise the spindle, and a fixed cam engageable by said follower, and contoured to drop the spindle for engagement with a fish during such part of the head's rotation as gives the spindle a component of movement in the direction of the fish's advance and also a component towards the fish's snout. and to raise the spindle, to disengage the fish-engaging member from the fish, by the time rotation of the head effects movement of the spindle transversely of the feeder-table in a direction away from the fish's snout.

13. The feeder table defined in claim 5, wherein the shifting means comprises a head rotatable about a generally vertical axis, a vertical spindle eccentrically carried thereby, a fish-engaging member upon the lower end of said spindle, means driven from the fish-advancing means to rotate said head in synchronization with the fish-advancing means, a collar upon the spindle, a lifter arm pivoted upon and rotatable with the head and engageable beneath said collar, a cam follower upon said arm, and a fixed cam engageable by the follower, and contoured to drop the spindle for engagement with a fish during such part of the head's rotation as gives the spindle a component of movement in the direction of the fish's advance and also a component towards the fish's snout, and to raise the spindle during the remainder of the head's rotation.

14. The feeder table defined in claim 5, wherein the shifting means comprises a head rotatable about a generally vertical axis, a vertical spindle carried eccentrically thereby, a fish-engaging member upon the lower end of said spindle, means driven from the fish-advancing means to rotate said head in synchronization with the fish-advancing means, and means to drop the spindle into position for engagement with a fish during such part of the head's rotation as gives the spindle a component of movement in the direction of the fish's advance and also a component towards the fish's snout, and to raise the spindle, to disengage the fish-engaging member from the fish, by the time the rotation of the head affords a different movement to the spindle.

15. The feeder table defined in claim 14, wherein the fish-engaging member is a hoe disposed generally transversely of the fish and engageable behind its pectoral girdle, and driving means extending to the spindle to rotate the latter to the same extent that it revolves about the head's axis, and thereby to maintain said hoe always transversely of the fish upon the table.

16. The feeder table defined in claim 15, wherein the driving means extending to the spindle includes a fixed sun gear concentric with the head's axis, a planet gear of equal size encircling the spindle and keyed thereto, and an idler gear interposed between said sun gear and said planet gear, thereby to rotate the spindle to the same extent that the spindle revolves around the head's axis, thus to dispose the hoe in one or another of a plurality of positions parallel to each other.

17. A feeder table for a fish-dressing machine comprising means to support individual fish for advance towards a registry point, such as a beheading knife, means engageable with each fish so to advance it, and means movable in a path which has components extending in the direction of the fish's advance and also towards the fish's snout, and engageable, while moving in such path, with a preselected point of each fish as the latter advances to shift each such fish headward if it is disposed too far tailward by continued engagement of said means with said fish while said means are substantialy stationary relative to said fish, and to leave such fish, regardless of the length of its head, and prior to its reaching the registry point, in correct alignment with such registry point.

18. The feeder table defined in claim 17, wherein the fish-shifting means includes an element engageable with the pectoral girdle of the fish by depressing the flesh at the tailward side of such pectoral girdle.

19. A feeder table for fish-dressing machines comprising, in combination with a knife engageable with individual fish, at a precise point in the fish's advance, to behead the fish, means to support and advance individual fish to the beheading point, while they are disposed transversely of their direction of advance, and means synchronized with the fish-advancing means and movable in a path which intersects the path of advance of the pectoral girdle of an advancing fish, approximately positioned lengthwise for beheading, thereby to engage behind the pictoral girdle of such fish and positively to move with and shift the same headward, if it is disposed too far tailward, and to leave the fish in position, regardless of the length of its head, and prior to its reaching the beheading point, in correct position for engagement by the beheading knife.

20. A feeder table for a fish-dressing machine comprising fish-advancing means to advance each individual fish bodily and disposed transversely of its length, to a registry point, and a fish-shifting member independent of said fish-advancing means but movable in synchronism therewith, positively engageable with an individual fish as it is advanced by said fish-advancing means, and operable during such advance to shift such fish positively and bodily snoutward, if the fish is disposed too far tailward, and with such reference to the registry point as to leave the fish in position, prior to its reaching the registry point, for movement into exact coincidence with the registry point by continued advance of said fish-advancing means.

21. The feeder table defined in claim 20, and means operable to move the fish-shifting means for effecting gradual deceleration of the fish headward during its movement thereby.

22. A feeder table for fish-dressing machines, comprising means to positively advance each fish bodily transversely of its length to a beheading point, and means movable independently of said fish-advancing means engageable with the pectoral girdle of each fish and operable by such engagement to shift the fish positively and bodily lengthwise, to dispose the pectoral girdle of the fish in a position such that it will be brought into exact coincidence with the beheading point subsequently solely by movement of the fish by said first means.

23. A feeder table for fish-dressing machines, comprising means to support each fish at a beheading point, means engageable with a preselected body element of each fish, drive means operable to move said engageable means generally lengthwise of the fish during engagement therewith for shifting the fish bodily lengthwise to dispose such fish element in a predetermined relationship to the beheading point regardless of the length of the fish head, and means operable to terminate such movement of said fish by said engaging means upon disposition of the fish element in such a predetermined relationship to such beheading point.

24. A feeder table for fish-dressing machines, comprising means to support a fish at a beheading point, a member engageable with a pectoral element of each fish, drive means to move said member generally lengthwise of the fish for shifting it bodily lengthwise to dispose such pectoral element in a predetermined relationship to the fish beheading point regardless of the length of the fish head, and means operable to disengage said member from such pectoral element upon disposition thereof in such predetermined relationship to such beheading point.

25. A device for feeding and aligning fish transversely of the plane of cutting of a header knife comprising a fish supporting table operatively positioned with respect to a fish header knife; fish conveying means operatively carried by said table to advance fish sidewise in a direction longitudinal of the table; fish engaging aligning plate means engageable with the gill opening bordering bone structure of a fish, whereby is engaged and aligned an engageable portion directly adjacent the meat portion of fish; and a traveling mounting means for said plate means movable in an angular path transverse of said fish table.

26. A device for feeding and aligning fish transversely of the plane of cutting of a header knife comprising a fish supporting table operatively positioned with respect to a fish header knife; fish conveying means operatively carried by said table to advance fish sidewise in a direction longitudinal of the table; fish engaging aligning plate means engageable with the gill opening bordering bone structure of a fish, whereby is engaged and aligned an engageable portion directly adjacent the meat portion of fish; and traveling mounting means for said plate means movable forwardly and transversely of said fish table.

27. A device for feeding and aligning fish transversely of the plane of cutting of a header knife comprising a fish supporting table operatively positioned with respect to a fish header knife; fish conveying means operatively carried by said table to advance fish sidewise in a direction longitudinal of the table; fish engaging aligning plate means engageable with the gill opening bordering bone structure of a fish whereby is engaged and aligned an engageable portion directly adjacent the meat portion of fish; traveling mounting means for said plate means movable forwardly and transversely of said fish table; and elevating means disengaging said plate means from the advancing fish at a predetermined point of its travel and traveling in spaced relation above the advancing fish while returning to fish engaging position.

28. In the method of feeding and aligning varying sized fish on a fish feeding table and transversely of the plane of cutting of a header knife, the step of moving an aligning engaging means lengthwise of a fish toward its head over a meat portion in skin depressing contact with a fish until a predetermined non-meat portion is engaged; and moving said engaging means and the engaged fish until the fish is aligned transversely of a table and with respect to the plane of cutting of the header knife.

NORFORD L. OATES.

REFERENCES CITED

The following references are of record in the file of this patent:

UNITED STATES PATENTS

| Number | Name | Date |
|---|---|---|
| 249,663 | Palson | Nov. 15, 1881 |
| 1,642,444 | Hovden | Sept. 13, 1927 |
| 2,208,645 | Savrda | July 23, 1940 |